(12) United States Patent
Kovacs et al.

(10) Patent No.: US 12,099,837 B2
(45) Date of Patent: Sep. 24, 2024

(54) MULTI-SURFACE APPLICATIONS

(71) Applicant: Stripe, Inc., San Francisco, CA (US)

(72) Inventors: Michael Julien Kovacs, South San Francisco, CA (US); Bowen Pan, South San Francisco, CA (US); Yuliya Gorlovetsky, South San Francisco, CA (US); Caitlyn M. Cawthron, South San Francisco, CA (US); Esther Lee, South San Francisco, CA (US); Dmitriy Gak, South San Francisco, CA (US); Gabriel Hurley, South San Francisco, CA (US); Katarzyna Babula, South San Francisco, CA (US); Timothy James Fontaine, South San Francisco, CA (US)

(73) Assignee: Stripe, Inc., South San Francisco, CA (US)

(*) Notice: Subject to any disclaimer, the term of this patent is extended or adjusted under 35 U.S.C. 154(b) by 89 days.

(21) Appl. No.: 18/094,286

(22) Filed: Jan. 6, 2023

(65) Prior Publication Data
US 2024/0231816 A1 Jul. 11, 2024

(51) Int. Cl.
*G06F 9/451* (2018.01)
*G06F 8/61* (2018.01)
(Continued)

(52) U.S. Cl.
CPC ............ *G06F 8/76* (2013.01); *G06F 8/61* (2013.01); *G06F 9/451* (2018.02); *H04L 67/306* (2013.01); *H04L 67/34* (2013.01)

(58) Field of Classification Search
CPC ... G06F 8/76; G06F 8/451; G06F 8/61; H04L 67/306; H04L 67/34
See application file for complete search history.

(56) References Cited

U.S. PATENT DOCUMENTS

| 8,756,617 B1 | 6/2014 | Boodman |
| 9,110,577 B1 | 8/2015 | Alur et al. |
(Continued)

FOREIGN PATENT DOCUMENTS

| CA | 2982062 A1 | 4/2019 |

OTHER PUBLICATIONS

Ahmed Seffah et al., Multiple User Interfaces Cross-Platform Applications and Context-Aware Interfaces, 2004, [Retrieved on May 16, 2024]. Retrieved from the internet: <URL: https://onlinelibrary.wiley.com/doi/pdf/10.1002/0470091703#page=28> 395 Pages (1-395) (Year: 2004).*

(Continued)

*Primary Examiner* — Anibal Rivera
(74) *Attorney, Agent, or Firm* — BAKERHOSTETLER

(57) ABSTRACT

This disclosure provides techniques for enabling developers to create a single implementation of an application that is accessible via different types of surfaces. For example, a developer can develop a single application and, based on how the developer defines parameters in a schema of the application, the corresponding user interfaces and features of the application can be used on different types of surfaces. Moreover, the single application can be made available to install via a hosted network and installed without regard to the type of surface that is being used to access the hosted network.

20 Claims, 6 Drawing Sheets

(51) Int. Cl.
 G06F 8/76 (2018.01)
 G06F 9/455 (2018.01)
 H04L 67/00 (2022.01)
 H04L 67/306 (2022.01)

(56) References Cited

U.S. PATENT DOCUMENTS

| | | | |
|---|---|---|---|
| 9,442,832 | B2 | 9/2016 | Bharara |
| 11,023,261 | B1 | 6/2021 | Jensen |
| 11,061,976 | B1 | 7/2021 | Brody |
| 11,070,646 | B1 | 7/2021 | Lingafelt |
| 11,107,580 | B1 | 8/2021 | Felton |
| 11,245,744 | B1 | 2/2022 | Brevoort et al. |
| 11,289,200 | B1 | 3/2022 | Gregg |
| 11,444,903 | B1 | 9/2022 | Brevoort et al. |
| 11,455,166 | B2 | 9/2022 | Brevoort et al. |
| 11,558,453 | B2 | 1/2023 | Brevoort et al. |
| 2005/0021405 | A1 | 1/2005 | Agarwal |
| 2007/0028043 | A1 | 2/2007 | Jantz |
| 2007/0201654 | A1 | 8/2007 | Shenfield |
| 2009/0182565 | A1 | 7/2009 | Erickson |
| 2012/0102485 | A1 | 4/2012 | Goldman |
| 2013/0232485 | A1* | 9/2013 | Murray ............ G06Q 30/0633 718/1 |
| 2016/0335058 | A1 | 11/2016 | Weckwerth |
| 2017/0235559 | A1 | 8/2017 | Saenz |
| 2018/0143949 | A1 | 5/2018 | Stachowicz |
| 2019/0265884 | A1* | 8/2019 | Penilla ............ G06Q 20/3274 |
| 2019/0332808 | A1 | 10/2019 | Dunjic |
| 2020/0019414 | A1 | 1/2020 | Byard |
| 2020/0204574 | A1 | 6/2020 | Christian |
| 2021/0036994 | A1 | 2/2021 | Samayavel |
| 2021/0149688 | A1 | 5/2021 | Newell et al. |
| 2021/0152541 | A1 | 5/2021 | Caldwell |
| 2022/0060523 | A1 | 2/2022 | Brevoort et al. |
| 2022/0245557 | A1 | 8/2022 | Minter |
| 2022/0414526 | A1 | 12/2022 | Darrah |
| 2023/0081429 | A1 | 3/2023 | Babtkis |
| 2023/0123496 | A1 | 4/2023 | David |

OTHER PUBLICATIONS

Asgarnezhad, et al., "Analysis and Evaluation of Two Security Services in SOA," IEEE 5th International Conference on Internet and Web Applications and Services (ICIW), May 2010, pp. 562-568.

Ranchal, et al., "Privacy Preserving Access Control in Service-Oriented Architecture," IEEE International Conference on Web Services (ICWS), Jun. 2016, pp. 412-419.

International Search Report and Written Opinion from PCT/US2024/010766, dated Apr. 15, 2024, 16 pages.

Notice of Allowance from U.S. Appl. No. 18/094,281, dated Jun. 6, 2024, 11 pages.

Notice of Allowance from U.S. Appl. No. 18/094,289, dated Jun. 12, 2024, 21 pages.

Notice of Allowance from U.S. Appl. No. 18/094,290, dated May 16, 2024, 17 pages.

* cited by examiner

MULTI-SURFACE APPLICATIONS

TECHNICAL FIELD

The disclosure generally relates to software application development.

BACKGROUND

When developing an application for a business and/or a merchant, software developers often need to create different versions of an application to run on different types of surfaces, platforms, and/or devices. For example, developers often create a mobile application and a separate desktop application so that users can access the same or similar functionality of an application through a mobile device and a desktop device, respectively.

SUMMARY

Developers often develop multiple implementations and different customizations of an application for different types of platforms, surfaces, and/or devices with which the developer wants the application to be compatible. As an example, developers often create a mobile application and a separate desktop application, so that users can access the same or similar functionality of an application through a mobile device and a desktop computer, respectively. In some examples, developers can make different, customized UIs for each version of the application to better accommodate smaller screens and/or web interfaces. However, developing separate mobile and desktop applications to provide similar functionality has drawbacks. For example, the mobile application can be: (1) developed in a different programming language than the desktop application, (2) programmed to use one or more different application programming interfaces (APIs) than the desktop application, (3) designed to work with a different operating system than the desktop application (e.g., mobile operating system vs. desktop operating system), and/or (4) programmed using a different logical framework than the desktop application.

This disclosure provides techniques for enabling developers to create a single implementation of an application that is accessible via different types of platforms, surfaces, and/or devices. For example, a developer can develop a single application and, based on how the developer defines parameters in a schema (e.g., an application model) of the application, the corresponding user interfaces and features of the application can be used on different types of platforms, surfaces, and/or devices. Moreover, the single application can be made available to install via a hosted network and installed without regard to the type of platform, surface, and/or device that is being used to access the hosted network.

In some examples, a method that is performed by a computer system is described. In some examples, the method comprises: receiving a request, from a first user, to install an application from a plurality of applications on a hosted network, wherein the application is associated with an application model, a set of capability data and a set of functionality data; and after receiving the request to install the application from the plurality of applications, accessing the set of capability data and the set of functionality data associated with the application to determine a collection of customizations and functionality to install in accordance with the first user's account settings, wherein: in accordance with a determination that the first user's account settings correspond to a first surface, installing a first set of user interfaces and functionality associated with the application based on the set of capability data and the set of functionality data; and in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

In some examples, a non-transitory computer-readable storage medium storing one or more programs configured to be executed by one or more processors of a computer system is described. In some examples, the one or more programs includes instructions for: receiving a request, from a first user, to install an application from a plurality of applications on a hosted network, wherein the application is associated with an application model, a set of capability data and a set of functionality data; and after receiving the request to install the application from the plurality of applications, accessing the set of capability data and the set of functionality data associated with the application to determine a collection of customizations and functionality to install in accordance with the first user's account settings, wherein: in accordance with a determination that the first user's account settings correspond to a first surface, installing a first set of user interfaces and functionality associated with the application based on the set of capability data and the set of functionality data; and in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

In some examples, a transitory computer-readable storage medium storing one or more programs configured to be executed by one or more processors of a computer system is described. In some examples, the one or more programs includes instructions for: receiving a request, from a first user, to install an application from a plurality of applications on a hosted network, wherein the application is associated with an application model, a set of capability data and a set of functionality data; and after receiving the request to install the application from the plurality of applications, accessing the set of capability data and the set of functionality data associated with the application to determine a collection of customizations and functionality to install in accordance with the first user's account settings, wherein: in accordance with a determination that the first user's account settings correspond to a first surface, installing a first set of user interfaces and functionality associated with the application based on the set of capability data and the set of functionality data; and in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

In some examples, a computer system is described. In some examples, the computer system comprises one or more processors and memory storing one or more program configured to be executed by the one or more processors. In some examples, the one or more programs includes instructions for: receiving a request, from a first user, to install an application from a plurality of applications on a hosted network, wherein the application is associated with an application model, a set of capability data and a set of functionality data; and after receiving the request to install the application from the plurality of applications, accessing the set of capability data and the set of functionality data associated with the application to determine a collection of customizations and functionality to install in accordance with the first user's account settings, wherein: in accordance with a determination that the first user's account settings correspond to a first surface, installing a first set of user interfaces and functionality associated with the application based on the set of capability data and the set of functionality data; and in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

In some examples, a computer system is described. In some examples, the computer system includes: means for receiving a request, from a first user, to install an application from a plurality of applications on a hosted network, wherein the application is associated with an application model, a set of capability data and a set of functionality data; and after receiving the request to install the application from the plurality of applications, means for accessing the set of capability data and the set of functionality data associated with the application to determine a collection of customizations and functionality to install in accordance with the first user's account settings, wherein: in accordance with a determination that the first user's account settings correspond to a first surface, installing a first set of user interfaces and functionality associated with the application based on the set of capability data and the set of functionality data; and in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

In some examples, a computer program product is described. In some examples, the computer program product comprises one or more programs configured to be executed by one or more processors of a computer system. In some examples, the one or more programs includes instructions for: receiving a request, from a first user, to install an application from a plurality of applications on a hosted network, wherein the application is associated with an application model, a set of capability data and a set of functionality data; and after receiving the request to install the application from the plurality of applications, accessing the set of capability data and the set of functionality data associated with the application to determine a collection of customizations and functionality to install in accordance with the first user's account settings, wherein: in accordance with a determination that the first user's account settings correspond to a first surface, installing a first set of user interfaces and functionality associated with the application based on the set of capability data and the set of functionality data; and in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

Executable instructions for performing these functions are, optionally, included in a non-transitory computer readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described examples, reference should be made to the Detailed Description below in conjunction with the following figures in which like reference numerals refer to corresponding parts throughout the figures.

DETAILED DESCRIPTION

Figure 1:
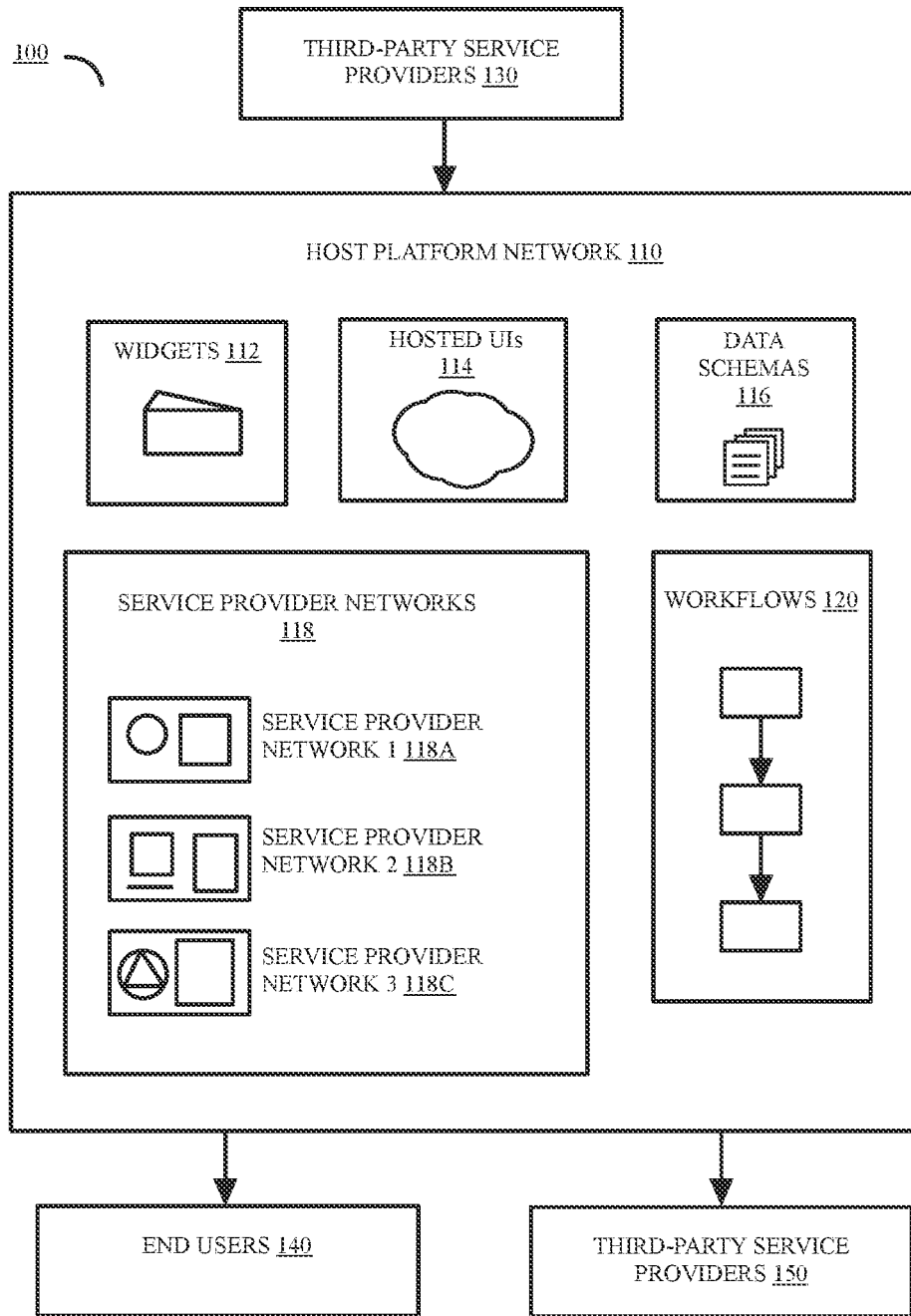
FIG. 1 is a block diagram illustrating the logical relationship between different entities that and components associated with a network ecosystem, in accordance with one or more embodiments.

The detailed description described below describes various examples with reference to the accompanying drawings. Some, but not all, examples are shown and described herein. Indeed, the examples can take many different forms and/or be augmented in many different ways. Accordingly, this disclosure should not be construed as limited to the examples set forth herein. Rather, these examples are provided so that this disclosure will satisfy applicable legal requirements.

Businesses today rely on software tools (e.g., applications, components, plug-ins, and/or the like) to run aspects of their operations. Such software tools are typically sourced by a group of software developers and maintained by a business or the group of software developers. However, a single software tool from a single group of software developers is rarely sufficient to perform all the functions needed by the business or its end users. It may be possible to combine third-party extensions, plug-ins, components, or ancillary software, but doing so can be labor intensive, complicated, and/or inefficient. Therefore, interoperability and/or integration are concerns for businesses because they provide user experiences for accessing shared data, automating processes, and additional functionalities that may not be provided by a single application. Poor interoperability and/or integration can lead to errors, a need for manual intervention, inefficiencies, delay, increased financial expenditure, and poor experience for the business's users (e.g., for a business user or customer if a portion of the software tool is part of a digital storefront).

Interoperability and integration are not the only factors that software tool users must consider. The security and/or privacy of business users' data (including customer data) is often another concern. Exposure of a business' data can result in financial consequences due to fraud or result in damage to customer relationships. Such data can include business information, information concerning one or more users of the business, payment information, account information, usage information, etc.). With software-as-a-service and cloud-based computing gaining widespread acceptance, much of a user's data can be transmitted between many locations and/or entities and stored remotely. As the number of software tools increases, particularly where each is managed by a different third-party provider, the number of entities that must be trusted to handle a business' data increases and the additional increase in the number of data exchanges leads to added security and/or privacy risks.

Therefore, demand exists for an ecosystem that allows businesses, applications, and functional services to integrate seamlessly with each other and/or to maintain better user experience across many different deployments. This can ensure the minimal and secure exchanging of (and/or access to) underlying sensitive data, such as business data and/or personal data associated with the business' customers.

The ecosystem can be built around functionality provided by a host platform that is associated with a trusted entity. In some examples, one or more resources of the host platform handles storage of data for processing by third-party applications, provides security and permissions-based access control to such data, and/or provides and maintains software development tools that enable third-party developers to develop applications that are compatible with the ecosystem. These software development tools can include software development kits (SDKs), application programming interfaces (APIs), data schemas, custom objects, software components, libraries, functions, routines, etc. that enable creation of modular applications that can work together. For example, a set of data sourced from one third-party entity can be used by application components of different entities (e.g., different third parties or the host platform). This is possible because of, for example, the host platform providing one or more data schemas that define how metadata is defined so that application components from different platforms can properly handle and/or process the set of data.

For such an ecosystem to be accessible to third-party developers (e.g., third-party service providers), mechanisms can exist that enable third parties to develop software tools that are compatible with the ecosystem and maintain the assurances regarding integration, user experience, and/or data integrity. A third-party developer may want to integrate their current application with other components, workflow steps, applications, and/or services from other third-parties or the host platform. Rather than having to look in lots of places or integrate all these pieces themselves via APIs, etc., the ecosystem can allow the third-party developer to go to a host platform network that exposes available integration options. The host platform network can allow third parties to set up their own networks (also referred to as "network-as-a-service") where another third-party developer (or other user) can find relevant components that can be integrated with a target application. A third-party network can be a third-party customized and/or curated version of the host platform network. Components within the third-party network can include branding and identify information for the third-party even though it is hosted by the host platform network.

Regardless of whether a network is managed by the host platform or by a third party, an end user sourcing components can know that the ecosystem is taking care of integration and/or data handling. This integration and/or data handling can be achieved due to the APIs, data schemas, and custom objects made available by the host platform. The host platform can also define, confirm, and/or enforce permissions for accessing data (e.g., stored by the host platform) by ecosystem components. For example, an application component for messaging customers can be permitted to access customer contact information but not a business' accounting data, even though both are stored by the host platform and associated with a user of the application component.

An example architecture is described herein for creating and deploying an ecosystem that meets some or all the criteria set forth above. Technical features of the architecture are addressed briefly below. It should be understood that the details discussed below are merely exemplary of architecture for creating and/or deploying an ecosystem that meets some or all the criteria set forth above, and other architectures could be used in addition to and/or in lieu of the architecture discussed below to create and deploy an ecosystem that meets some or all the criteria set forth above.

Various embodiments described herein make reference to one or more of the components of FIG. 1, which is explained in more detail below. FIG. 1 illustrates an example block diagram 100. The components illustrated therein can perform, alone or in any combination, one or more processes for implementing one or more aspects of an application exchange ecosystem that can enable one or more of the features described herein.

FIG. 1 is block diagram 100 that illustrates the logical relationship between different entities and components associated with an ecosystem for integrating such components with a host platform network, in accordance with one or more embodiments. FIG. 1 includes host platform network 110, representing infrastructure (e.g., hardware and/or software) associated with a host platform that supports the ecosystem. As shown, the host platform network 110 includes one or more widgets 112, one or more hosted user interfaces (UIs) 114, one or more data schemas 116, and one or more workflows 120. In some examples, a widget is one or more of an application or an application component. In some examples, a hosted user interface (UI) is one or more UI elements provided by and/or managed by the host platform. For example, a hosted UI element can be a pre-made UI element that end users 140 and/or third-party service providers 150 can integrate into their own application. As shown, end users 140 and third-party service providers 150 receive content from host platform network 110. An end user of end users 140 can be a party that uses (e.g., causes download, execution, and/or integration of) a component accessed via network 110 or 118A-118C. A third-party service provider of third-party service provider 150 can be a party that uses (e.g., causes download, execution, and/or integration of) a component accessed through network 110 or 118A-118C into their own application (and can also be considered an end user in some scenarios). In some examples, a data schema describes the logical organization of one or more databases. In some examples, data schemas support the exchange of data between different applications or components running on the host platform and provides a uniform interface for controlling permissions based on schema (e.g., a shape of the data to be shared). In some examples, a workflow describes a set of steps for accomplishing a particular task. For example, these steps can be downloaded (e.g., as widgets, hosted UIs, data schemas) and implemented together on a third-party webpage or host platform. In some examples, data schemas also specify the permissions in which a third-party component or application can access data associated with a host or other third-party component or application. In some examples, data schemas are used to determine data access by various applications on a per-user basis. Depending on the role of the user or organization, a data schema may specify that a second application cannot access data from a first application that has specific access permissions specified.

FIG. 1 additionally depicts service provider networks 118. These service provider networks 118 are networks that are managed by (e.g., created, curated by) one or more third-party service providers. This is the network-as-a-service concept discussed above. For example, a third-party service provider can be a software developer of tax preparation software tools. This software developer creates a tax preparation-related component that is compatible with the ecosystem (e.g., using software development tools provided by the host platform). This ecosystem-compatible component can be offered to end users 140 via the software developer's service provider network (e.g., 118A). An end user (e.g., 140) can also navigate to other service provider networks (e.g., 118B or 118C) to download other components that can be integrated with the tax preparation-related component. For example, the end user can download a business transaction tracking application from network 118B and a real estate expense tracking application component from network 118C. In this example, the business transaction tracking application integrates the tax preparation-related and business transaction tracking components so that data can be shared between them, and their functionality combined.

In some examples, the network-as-a-service offered by the host platform can handle one or more of the following functions: user account management, billing and licensing, and installer activation. User account management can include handling user account information (e.g., logins, account history, etc.). Billing and licensing can include billing users for software licenses, accepting payments, managing licenses and subscriptions, etc. Installer activation can include enabling licensed components accessed through the host platform network, configuring the components to work with the end user's system, connecting the components with other services or applications that the end user wants to integrate with, etc.

FIG. 1 additionally depicts third-party service providers 130 providing content into host platform network 110. Third-party service providers 130 can include the same or different third parties than third-party service providers 150. Third-party service providers 130 include third parties that make contributions to the host platform network 110. These contributions can be one or more widgets 112, one or more hosted UIs 114, one or more data schemas 116, one or more service providers networks 118A-118C, and/or one or more workflows 120. For example, a third-party service provider of third-party service providers 130 can be an entity that developed a single component that is made available to end users 140 and/or to third-party service providers 150 via host platform network 110. A third-party service provider can be a party that includes a component (from another third party) into their own service provider network and offers it to end users for integration with the service provider's application. For example, the third-party that manages network 118B (offering the business transaction tracking application) can also offer the tax preparation-related application component in network 118B. End users looking for a tax software tool compatible with the business transaction tracking application would see the tax preparation-related application component available for retrieval in network 118B.

FIG. 1 depicts service provider networks 118A-118C within host platform network 110. However, this depiction is not intended to be limiting in terms of how any components are stored, managed, etc., but are merely illustrated as logical relationships. In some examples, a service provider network is accessible via a host platform network. For example, an end user (e.g., 140) can access service provider network 118A by navigating within host platform network 110. In some examples, a service provider network is based on host platform network 110. For example, the service provider network is hosted by a third-party service provider but is built based on components of host platform network 110. In some examples, third-party service provider components and applications are hosted by the host platform network and have been verified and approved for submission to the host platform network.

Figure 2:
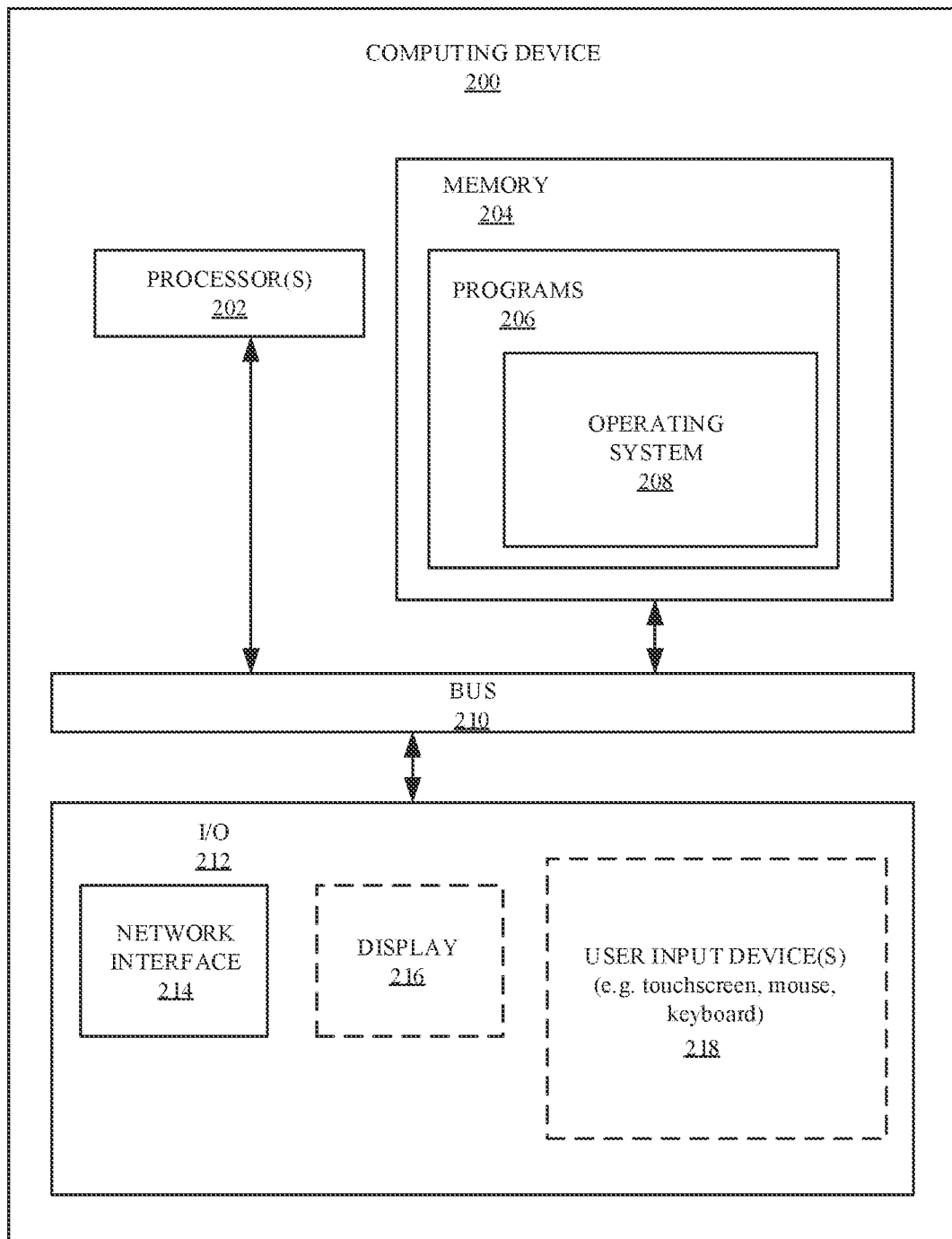
FIG. 2 is a block diagram of a computing device that implements one or more processes in accordance with one or more embodiments described herein.

FIG. 2 illustrates an example computing device 200 (alternatively referred to as computing system 200, computer system 200, system 200, electronic device 200, and/or device 200) that can be used to support and/or implement the architecture and operations in accordance with one or more embodiments described herein. It will be apparent to those of ordinary skill in the art, however, that other alternative systems of various system architectures can also be used. For example, the other alternative systems can be a computing system with fewer, different, and/or additional components than those illustrated in (and/or described in relation to) FIG. 2 or a computing system including one or more devices 200 as illustrated in FIG. 2. In some examples, computing device 200 is a general-purpose computer. In some examples, computing device 200 is a special purpose (e.g., application specific) hardware device.

Computing device 200 illustrated in FIG. 2 includes one or more bus (or other internal communication component) 210 for communicating information and one or more processors 202 coupled to the bus 210 for processing information. Device 200 includes memory 204 coupled to bus 210. Memory 204 can include random access memory (RAM) or other volatile storage device for storing information and instructions to be executed by one or more processors 202 and/or for storing temporary variables or other intermediate information during execution of instructions by one or more processors 202. Memory 204 can also include non-volatile memory storage, such as read-only memory (ROM) and/or a static storage device for storing static information and instructions executable by processors 202, and one or more data storage devices such as a hard disk (e.g., magnetic disk), flash memory storage, or optical disk and its corresponding disk drive. This data storage device can be coupled to bus 210 for storing information and instructions. For example, memory 204 can store programs 206 in non-volatile memory. In some examples, the programs include one or more sets of computer-executable instructions for execution by the one or more processors 202. When ready for execution, the instructions are loaded into volatile memory and passed the processors for execution. The programs 206 can include an operating system 208 for managing the computing device's basic functionality, such as scheduling tasks, executing applications, and controlling peripheral devices. As used herein, the term "program" or "computer program" are considered synonymous with "application," "computer application, or "application component" unless otherwise stated in the context in which the term is used.

Computing device 200 can also include one or more input/output (I/O) components 212. FIG. 2 illustrates several example I/O components grouped together within I/O components 212 for illustration purposes only, and each such component therein does not necessarily need to be located together, or within a part of computing device 200. For example, an I/O component 212 can be an external device coupled to an interface of computing device 200. Computing device 200 can include network interface 214 for handling uplink and/or downlink communications with one or more other devices. The network interface 214 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, to communicate over the Internet, a wide area network, a local area network, an ad-hoc (device-to-device network), or the like. Network interface 214 can be a modem connection, and/or any other mechanism that provides connectivity between the computing device 200 and one or more other devices. Note that one or more of the components of this system illustrated in FIG. 2 and associated hardware can be used in various embodiments as discussed herein.

Computing device 200 can optionally be coupled to display device 216, such as a light emitting diode (LED) display or a liquid crystal display (LCD) (e.g., coupled through bus 210 for displaying information to a user of computing device 200). Display device 216 can be integrated into computing device 200 (e.g., a touchscreen of a smartphone) or be external to computing device 200 (e.g., an external display coupled via a cable with device 200).

Computing device 200 can optionally include one or more user input device(s) 218, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 216.

In some examples, computing device 200 is a server or system of servers. For example, the server can be a collection of one or more computer hardware machines working together to perform processes and tasks described with respect to computing device 200. Thus, computing device 200 can be considered a logical construct, and references thereto can and should be interpreted as encompassing scope that includes computing device 200 being comprised of one or more computing devices (e.g., as device 200 is described) or several devices that together behave as computing device 200 has been described. As one of skill would appreciate, there is no requirement express or implied herein that the components of computing device 200 be dedicated or physical resources, or that the components must be located physically together. Rather, computing device 200 can be embodied in one or more virtual machines and/or certain functional components of computing device 200 can be remote from other functional components of device 200.

Figure 3:
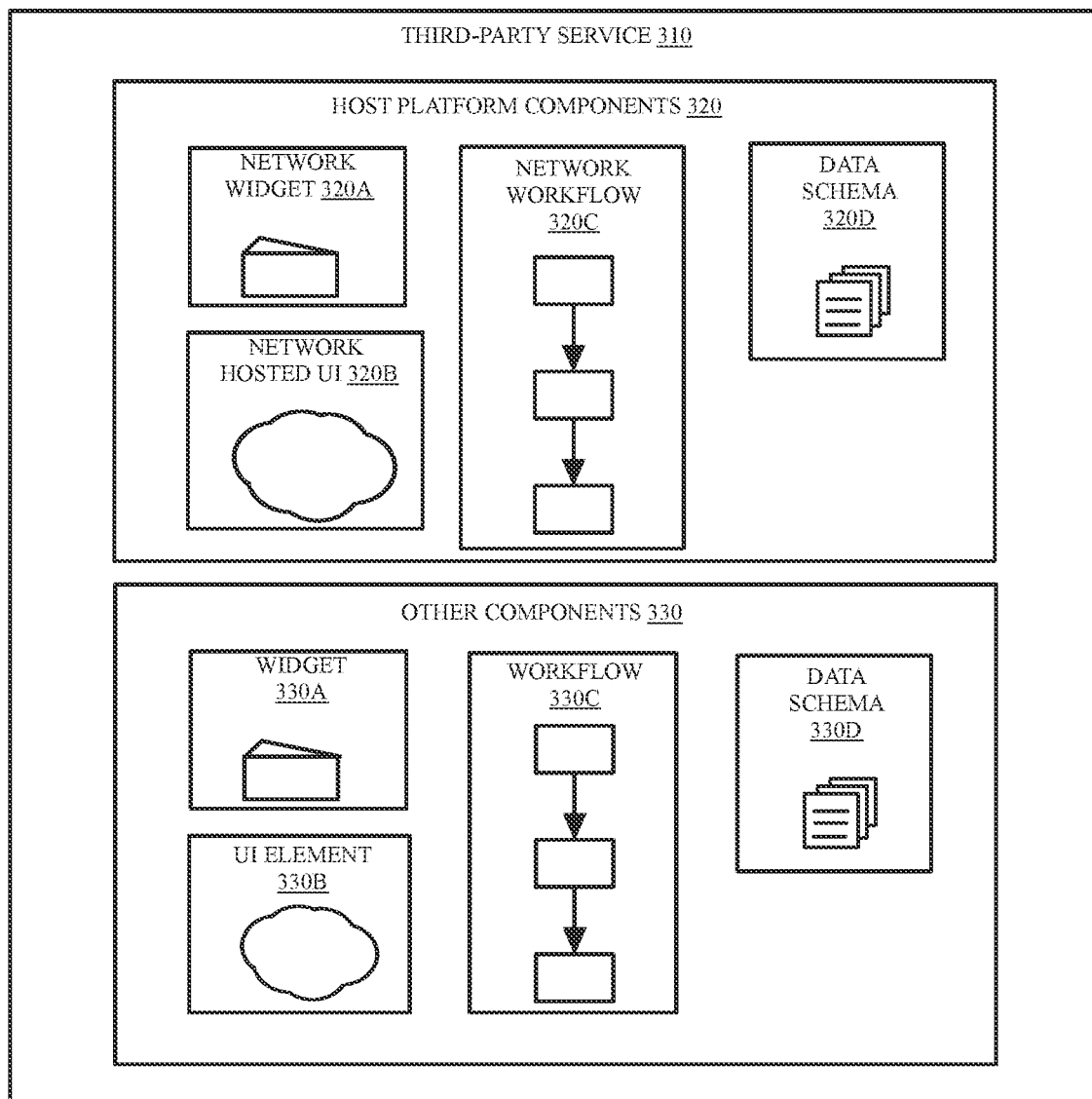
FIG. 3 is a block diagram showing an example service deployed using network components in accordance with one or more embodiments described herein.

FIG. 3 illustrates block diagram 300 illustrating the logical components of an example third-party service 310, in accordance with one or more embodiments. It should be recognized that more or fewer components and/or different components can be included in third-party service 310. A third-party service (e.g., 310) can be an application and/or a webpage. In this example, third-party service 310 is an application that includes both host platform components 320 and other components 330. For example, continuing with the example described with respect to FIG. 1, third-party service 310 is a business transaction tracking application. The business transaction tracking application includes host platform components 320 sourced from host platform sources (e.g., host platform network 110 or service provider networks 118) and integrated into the application and other components 330 sourced from the third-party separate from the host platform sources. In some examples, the integration of these components together is due to customization by an end-user. In other examples, the integration is performed by a third-party service provider (e.g., 150). Host platform components 320 include network widget 320A, network hosted UI 320B, network workflow 320C, and data schema 320D. For example, widget 320A can be an application component that arranges transaction data for presentation as a spreadsheet. Network hosted UI 320B can be a user interface element displayable by the application for receiving a user input command to refresh the transaction data from a server. Network workflow 320C can be a series of steps (e.g., functions and interfaces) that an end user of the application uses to select a transaction, choose to refund a transaction, receive a verification credential for authorizing the refund, and submit the refund for processing. Data schema 320D can be a data schema that describes how the business tracking application stores transaction data and who has access to the transaction data, so that such data can be read by other services.

As mentioned above, the example business transaction tracking application represented by third-party service 310 also includes other service platform components 330 not sourced from host platform sources (e.g., host platform network 110). For example, other service platform components 330 can include components not sourced from the host platform ecosystem, such as those that are developed by the third-party themself or sourced from another third party but not via a service provider network (e.g., 118A-118C).

Other service platform components 330 include widget 330A, UI element 330B, workflow 330C, and data schema 330D. For example, widget 330A can be an application component that adds support for foreign languages in interfaces of the application. UI element 330B can be a user interface element displayable by the application for providing an interface of a search feature. Workflow 330C can be a series of steps (e.g., functions and interfaces) sourced from an open-source repository that an end user of the application uses to select displayed data, take a screenshot by the application, activate an email client, and send the screenshot via the email client. Data schema 330D can be a data schema that describes how the business tracking application stores transaction data, so that such data can be read by other services.

In accordance with some examples, the architecture described above can allow developers to build and/or distribute modular applications that are built on a common ecosystem platform. This ecosystem stands in contrast to some legacy models of software tool development and distribution, such as (1) proprietary silos of vertically integrated components that lead to customers being "locked-in" to a set of software that may not meet all of their needs and/or (2) custom development of software solutions for integrating multiple software tools by different developers which requires development time, resources, and ongoing support.

With the above ecosystem framework in mind, attention is now turned to techniques for enabling developers to create a single implementation of an application or a component of an application (collectively referred to as an application herein) that is accessible via different types of surfaces, platforms, and/or devices (collectively referred to as surfaces herein). To help explain such techniques, three phases will be described using an example of a developer submitting tax software to a hosted network (e.g., a marketplace, an application store, host platform network 100, and/or service provider network 118A) that is then used to add the tax software to an application of a pizza merchant. The three phases include (1) the developer of the tax software submitting the tax software to the hosted network, (2) the hosted network (and/or a member of the hosted network) verifying that the tax software operates as intended on different types of surfaces, and (3) the pizza merchant installing the tax software to be accessible via different types of surfaces through the hosted network. It should be recognized that such an example is discussed below for explanatory purposes only and that other examples are within scope of this disclosure.

As mentioned above, the first phase includes the developer of the tax software submitting the tax software to the hosted network. In some examples, the tax software is submitted as an application model that includes functionality data, customization data, and/or capability data, each described further below. In some examples, the application model is defined in a way that is not specific to a particular type of surface such that the application model is not defined for each type of surface where the application is able to be used. Instead, the application model is defined in a form understandable by the hosted network so that the hosted network can automatically generate versions of the application for different types of surfaces using the application model. In some examples, the application model can use, be defined based on, and/or be according to a data schema provided by the hosted network for providing applications to the hosted network. In such examples, the application model can be developed using a single code base (and/or a single programming language, sandbox, and/or logic).

In some examples, functionality data is data that defines what the application will provide (e.g., to the hosted network). For example, the functionality data can include logic for the tax software. The logic can be defined as a list of instructions and/or steps that need to be performed with respect to the tax software. For example, the logic can be code that expresses what operations are performed when the tax software is executed. In one example, the logic can include accessing a pre-tax price of a product, computing an amount of tax for the product, adding the amount of tax to the pre-tax price to produce a total price for the product, outputting the total price, and displaying a user interface with the pre-tax price, the amount of tax, and the total price.

In some examples, customization data is data that defines how the application should be rendered, such as how to render one or more graphical user interfaces resulting from execution of the application. For example, the customization data can include how specific user interfaces provided by the application and/or how generic user interfaces provided by the hosted network should be displayed (e.g., colors, font, logos, and/or titles)). In some examples, the customization data includes viewports and/or sizes of required areas that are used for display of elements from the application. In the example of the tax software, the viewports can indicate that output of the application needs at least 2 inches by 2 inches in a user interface. In some examples, the customization data defines the format, look, and/or visual appearance of specific graphical user interfaces that have been customized by the developer of the application. Such definitions can modify default and/or generic appearances of user interfaces that the hosted network would use in lieu of customization data for a particular output. In the example of the tax software, the format can require an ordering of outputs in a user interface and how visual elements will be displayed in different sizes of user interfaces. For example, the format can require that the order of visual elements includes the pre-tax price visually before the total price and that the pre-tax price is visually above the total price. In some examples, the customization data defines visual characteristics that are either specific to the application and/or should be customized to a user installing the application. Examples of such visual characteristics include colors, types of fonts, and sizes of font.

In some examples, capability data is data that enables the functionality data and/or the customization data to be used to generate different versions of the application for different types of surfaces. In such examples, capability data can define what the application needs from the hosted network. For example, capability data can include permissions data (e.g., to access a database and/or an API), request data (e.g., a request to use a particular API or process of the hosted network), interactions data (e.g., a request to interact with or include one or more components provided by the hosted network in the application), storage data (e.g., data that the application would like to store via the hosted network), and/or interfacing data (e.g., data corresponding to a user interface that has been customized by the developer of the particular application that should be used in the place of a generic user interface and/or data corresponding to one or more components provided by the application to the hosted network). In some examples, permissions data is specific to a type of surface (e.g., permission to display data on a point of sale (POS) device), relate to a communication required during execution (e.g., permission to access data stored remote from the tax software and/or permission to use an API provided by the hosted network), and/or relate to an operation of the tax software (e.g., permission to display content, and/or permission to store data). In some examples, the capability data includes an entry point for the application, indicating how the application should be accessed. For example, the entry point for the tax software can be defined as an event to purchase a product and/or an instruction to provide a cost of a product. In some examples, the functionality data includes indications of external resources and/or external operations used by the application. Such indications can indicate to the hosted network how the application will interact with other components. In the example of the tax software, an external resource can include a rendered image of a character for a type of currency that is stored in a database external to the tax software, and an external operation can include an API that is used to communicate with a different application to obtain a percentage of the pre-tax price that the amount of the tax is equal to.

As mentioned above, the second phase includes the hosted network verifying that the tax software operates as intended on different types of surfaces. Examples of different types of surfaces include a point of sale (POS) device, a dashboard application, a mobile device, a kiosk application, and a web application. In some examples, at least a portion of such verification is performed by an automated process of the hosted network. In some examples, a member of the hosted network manually performs at least a portion of such verification.

In some examples, the verification includes generating versions of the application for different types of surfaces and executing those versions to create screenshots of the application during execution to verify that the application performs as expected. In such examples, execution of a version of the application can occur in a sandbox so as to isolate the execution. In some examples, a version of the application is automatically generated by translating the application model (e.g., the functionality data, the customization data, and/or the capability data) to code that operates on a particular type of surface.

In some examples, the verification includes comparing the screenshots with execution of the application on the different types of surfaces (e.g., by a member and/or developer associated with the hosted network and not the developer of the application). For example, a screenshot of output of the tax software in a mobile application can be compared to a user interface displayed during actual execution of the tax software on a mobile device using a mobile application. Once confirmed that the screenshots match the execution of the application on the different surfaces, the application is verified with respect to the hosted network.

In some examples, once the application is verified, the application can be made available to users of the hosted network. For example, the application can be added to a marketplace, an application store, and/or other repository that is accessible to users of the hosted network. In such examples, users of the hosted network can install the application via the hosted network (e.g., on the hosted network and/or on a device in communication with the hosted network) and access the application on different types of surfaces, as further discussed below with respect to the third phase.

As mentioned above, the third phase includes the pizza merchant installing the tax software to be accessible via different types of surfaces through the hosted network. In some examples, a user that is installing the application is not selecting the application for a particular type of surface but rather selecting the application and having the hosted network configure the application according to the user's account with the hosted network. In such examples, the hosted network installs different versions of the application on the hosted network (e.g., at a location corresponding to an account of the pizza merchant) such that the pizza merchant can access the application via the hosted network through different surfaces and the application will be configured for the surface used to access the application.

In some examples, installing an application on a surface includes translating the functionality data, the customization data, and/or the capability data to a version of the application that is configured to operate on the surface. In some examples, installing the tax software includes customizing the tax software to a user that is installing the tax software. Such customizations can include where to place the application in a user interface, which user interfaces to place the application, colors, types of fonts, font sizes, backgrounds, logos, and/or any other content that is specific to the user.

In some examples, the hosted network determines the particular type of surface that the application will be installed on using the functionality data, the customization data, the capability data, and/or the account settings/preferences (collectively referred to as account settings) for the pizza merchant. As an example, the hosted network can determine that a version of the application should be installed on a point of sale (POS) device when the application model for the application includes functionality data specific to the POS device (e.g., such as a permission to write to a PoS device and/or permission to include a logo in a graphical user interface displayed by the POS device). For another example, the pizza merchant's account can be associated with certain permission that allow applications to be executed on particular types of surfaces, causing the hosted network to install the application for the particular types of surfaces allowed by the certain permissions of the pizza merchant.

Figure 4A:
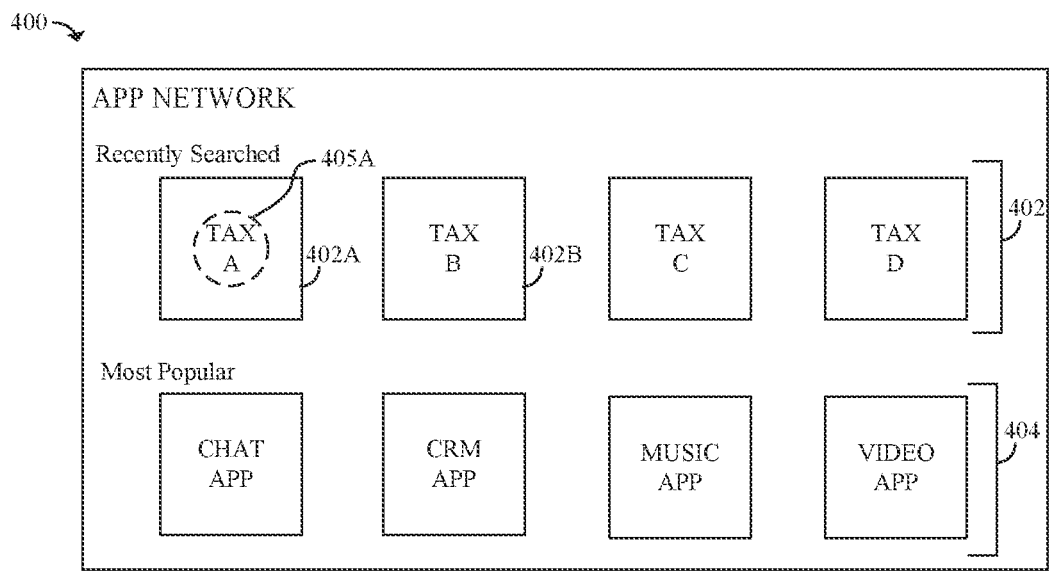
FIGS. 4A-4B illustrate exemplary user interfaces for installing an application in accordance with some embodiments described herein.
Figure 4B:
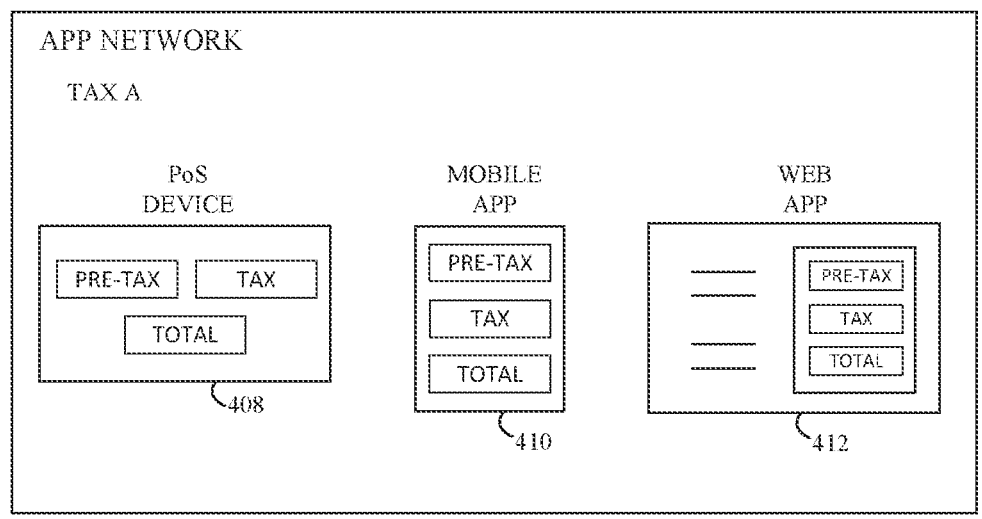

FIGS. 4A-4B illustrate exemplary user interfaces for installing an application in accordance with some examples described herein. Such user interfaces are displayed during the third phase described above, after the application has been (1) submitted to the hosted network (e.g., via the first phase described above) and (2) verified to be distributed by the hosted network (e.g., via the second phase described above). FIGS. 4A-4B continue the example described above with respect to the tax software and the pizza merchant.

FIG. 4A illustrates an example of user interface 400 for the hosted network. In some examples, user interface 400 allows for a user (e.g., the pizza merchant) to navigate to different components (e.g., widgets, hosted UIs, data schemas, components from other service provider networks, workflows, and/or full end-to-end applications, as described above with respect to FIG. 1) provided by the hosted network for installation. User interface 400 can take many forms, including as a web page or a screen of an application. It should be recognized that other forms, designs, and/or configurations of user interface 400 are within scope of this disclosure and that user interface 400 is merely an example for illustrative purposes.

As illustrated in FIG. 4A, user interface 400 includes recently searched representations 402 (e.g., selectable user interface objects corresponding to results from applications that have been recently searched) and most popular representations 404 (e.g., selectable user interface objects corresponding to the most popular applications for the hosted network). In some examples, different applications included in user interface 400 are developed by different parties. For example, tax A 402A can correspond to the tax software described above and be developed by a developer (e.g., a third-party developer) that is not associated with the hosted network. Other applications can be developed by a developer (e.g., a first-party developer) of the hosted network or a third-party developer that is different from the developer that developed tax A 402A.

FIG. 4A further illustrates receiving input 405A (e.g., user input) on tax A 402A, causing a tax application corresponding to tax A 402A to be installed. In some examples, the tax application can be installed in an application of the pizza merchant that is hosted by the hosted network. In such examples, installing the tax application adds the functionality of the tax application to the application of the pizza merchant for when the application is accessed via different types of surfaces. In some examples, installing the tax application causes different versions of the tax application to be installed and/or made accessible to the pizza merchant for different types of surfaces. As mentioned above, such different types of surfaces can be determined based on the functionality data, the customization data, the capability data, and/or account settings of the pizza merchant.

In one example, the tax application is installed on a PoS device, a dashboard web page, and an application developed by the pizza merchant even though the application model for the tax software does not include particular logic directed to the POS device, the dashboard web page, and/or the application developed by the pizza merchant. Rather, in some examples, the hosted network uses the general logic defined in the tax application and/or the application model for the tax application with additional logic (e.g., a set of APIs) that enables the tax application to work on a particular type of surface. In some examples, the additional logic is chosen based on the type of surface that a respective user (e.g., business user and/or customer) is using to access the application (e.g., at a current instance in time). Thus, in some examples, the hosted network can provide different additional logic (e.g., APIs) for an application when different types of surfaces are used to execute a version of the application. In some examples, the hosted network executes (e.g., runs) the general logic defined via the tax software in a sandbox. In some examples, the type of sandbox is chosen based on the type of surface that the respective user is using to access the application. In some examples, once the application has been verified to work in the sandbox, the application is installed on different types of surfaces.

At FIG. 4B, in response to detecting input 405A of FIG. 4A directed to tax A 402A, user interface 406 is displayed with representations of user interfaces 408-412. As illustrated in FIG. 4B, user interfaces 408-412 are visually different and represent how output of the tax application can be displayed differently via different types of surfaces. In some examples, such differences are not defined in the application model received from the developer but rather are determined by the hosted network when installing the tax application on different types of surfaces. For example, the application model (e.g., the functionality data, the customization data, and/or the capability data) for the tax application might not include logic for displaying user interfaces 408-412. Rather, the hosted network automatically determines, based on the customization data and/or account settings of the pizza merchant, how user interfaces 408-412 should be displayed via each type of surface and automatically generates each user interface.

In some examples, if the developer of the tax application included logic for displaying a user interface via a respective surface, the representation corresponding to the user interface would be displayed based on the logic. In some examples, when the pizza merchant and/or a customer of the pizza merchant accesses a user interface including content from the tax application via a particular type of surface, a user interface represented by one or more of user interfaces 408-412 is displayed via the particular surface.

In some examples, user interface 408 is configured to be displayed on a PoS device. In such examples, user interface 408 is the output of the tax application and includes visual representations for a pre-tax price, an amount of tax, and a total price. The visual representations are organized such that the pre-tax price and the amount of tax are on the same line and the total price in on a line below the other two. In some examples, such ordering is defined in the tax application such that the pre-tax price is before the amount of tax and the amount of tax is before the total price.

In some examples, user interface 410 is configured to be displayed by a mobile device, such as in an application executing on the mobile device. For example, the application can include display of user interface 410 that is provided by the hosted network. In such examples, user interface 410 is the output of the tax application and includes visual representations for a pre-tax price, an amount of tax, and a total price. As illustrated, the visual representations in user interface 410 are similar size and font to the visual representations in user interface 408. However, the difference in the visual representations in user interface 410 as compared to user interface 408 is that the visual representations are visually organized in a column. Such result can occur due to the application model for the tax application requiring an ordering of the visual representations but not requiring that they be in the same column when there is not enough space (e.g., in user interface 408).

In some examples, user interface 412 is configured to be displayed by a web browser, such as in a web browser executing on a desktop computer. In such examples, user interface 412 includes a left portion that includes content from the application of the pizza merchant (e.g., not from the hosted network and/or not from the tax software) and a right portion that includes content from the tax application. In some examples, content from the tax application includes visual representations for a pre-tax price, an amount of tax, and a total price. As illustrated, the visual representations in user interface 410 are the same font but different size than the visual representations in user interfaces 408 and 410. Such result can occur due to the application model for the tax application requiring an ordering of the visual representations but not requiring that they be the same size when there is not enough space (e.g., in user interface 412).

In some examples, aspects of user interfaces 408-412 are customized based on the particular user (in this example, the pizza merchant). For example, the tax application can use a particular branding and/or style for displaying content and/or color scheme for output of the tax application. Instead of using the particular branding, style, and/or color scheme, the tax application can output user interfaces that match account settings (e.g., stored by the hosted network) for the pizza merchant. Accordingly, output of the tax application for the pizza merchant can have the branding and/or be in the style and/or color scheme that matches the account settings for the pizza merchant instead of the branding, style, and/or color scheme defined in the tax application. It should be recognized that other preferences and/or settings of the pizza merchant can be used to change how output of the tax application looks when installed for the pizza merchant.

Figure 5:
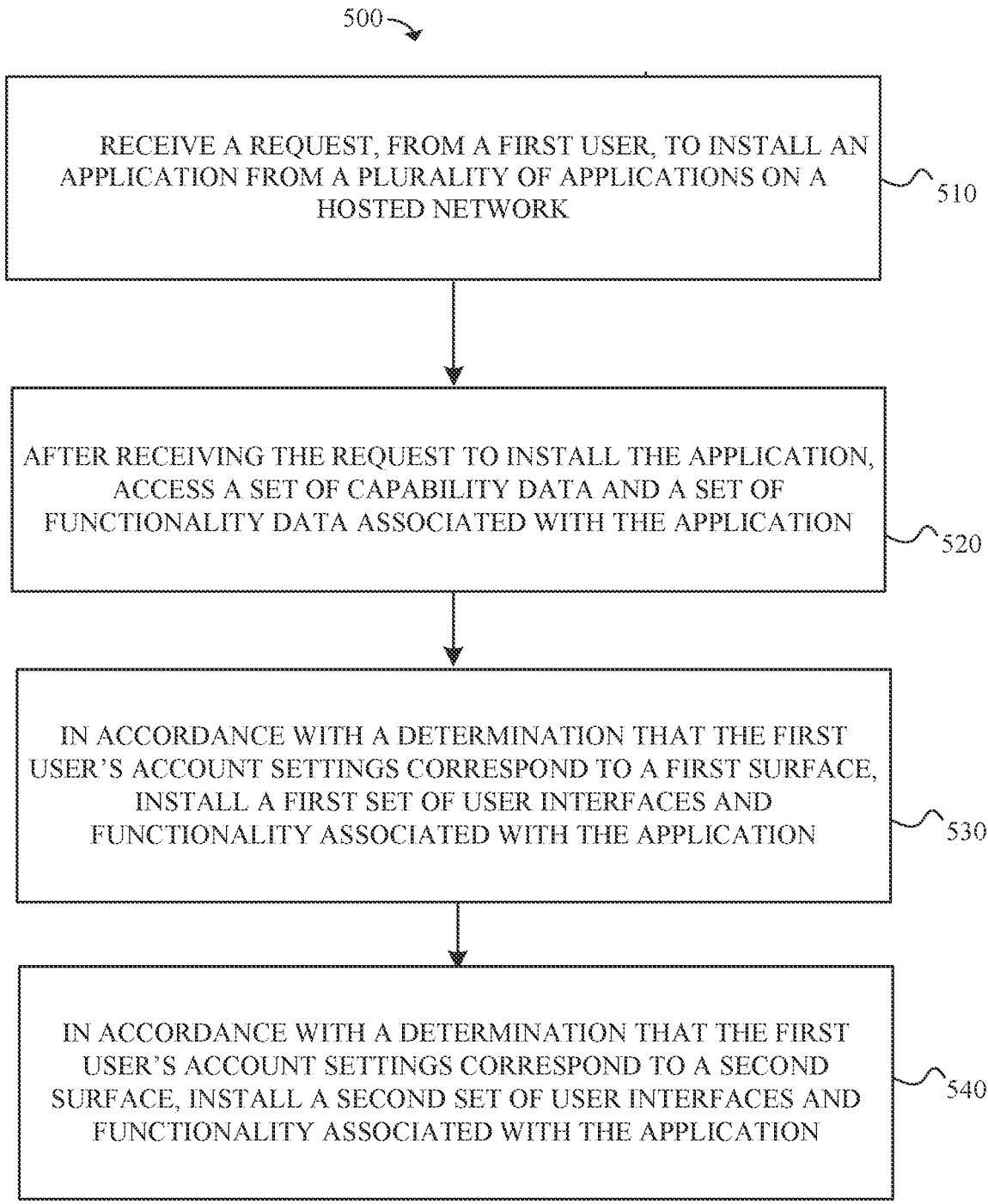
FIG. 5 is a flow diagram illustrating a method for installing an application in accordance with one or more embodiments described herein.

FIG. 5 is a flow diagram illustrating a method (e.g., method 500) for installing an application in accordance with one or more embodiments described herein. In some examples, method 500 is performed at a computer system (e.g., a smart phone, a desktop computer, and/or a tablet). In some examples, the computer system that performs the method 500 includes one or more components as described above in relation to the components of network 100, such as host platform network 110 of FIG. 1, computing system 200 of FIG. 2, and/or one or more components described above in relation to FIG. 3.

At block 510, the computer system receives, from a first user, a request to install an application from a plurality of applications on a hosted network. In some examples, the application is associated with an application model, a set of capability data, and/or a set of functionality data. In some examples, the computer system receives the request to install the application after a user has searched the hosted network for the application using a search term corresponding to the application. In some examples, the application model includes the set of capability data and the set of functionality data. In some examples, the set of capability data and/or the set of functionality data is defined in one or more schema provided by the hosted network, and the set of capability data and/or the set of functionality data can be determined (e.g., directly determined and/or determined through an inference) from the one or more schema.

At block 520, after receiving the request to install the application from the plurality of applications, the computer system accesses the set of capability data and the set of functionality data associated with the application to determine a collection of customizations and functionality to install in accordance with the first user's account settings.

At block 530, in accordance with a determination that the first user's account settings correspond to a first surface (e.g., a PoS device, a website, a mobile application, a desktop application, and/or another type of application), the computer system installs a first set of user interfaces (e.g., graphical user interfaces and/or application programming interfaces) and functionality associated with the application based on the set of capability data and the set of functionality data. In some examples, the first set of user interfaces and functionality are installed in the hosted network such that when a different computer system (e.g., different from the computer system) access and/or request functionality provided by the application that the application is provided to the different computer system in a form configured for the particular surface being used by the different computer system.

At block 540, in accordance with a determination that the first user's account settings correspond to a second surface (e.g., a PoS device, a website, a mobile application, a desktop application, and/or another type of application), the computer system installs a second set of user interfaces (e.g., graphical user interfaces and/or application programming interfaces) and functionality associated with the application based on the set of capability data and the set of functionality data. In some examples, the first set of user interfaces and functionality are different from the second set of user interfaces and functionality. In some examples, the second set of user interfaces and functionality are installed in the hosted network such that when a different computer system (e.g., different from the computer system) access and/or request functionality provided by the application that the application is provided to the different computer system in a form configured for the particular surface being used by the different computer system.

In some examples, the set of capability data indicates one or more permissions required by the application, one or more events that occur during execution of the application, one or more events external to the application that cause the application to perform an operation, and/or one or more application programming interfaces used by the application.

In some examples, the first set of user interfaces includes a graphical user interface of the application that has been customized to match the first user's account settings (e.g., a preference and/or setting that the first user established with the hosted network).

In some examples, the functionality data includes a schema for a graphical user interface. In some examples, the graphical user interface is automatically generated for the first surface based on the schema after receiving the request to install the application and in accordance with a determination that the first user's account settings correspond to the first surface. In some examples, functionality of the first set of user interfaces and functionality is based on a type of the first surface.

In some examples, hosted network includes a single permissions model for a plurality of different surfaces such that permissions for the application during installation (1) are dynamically determined based on a type of user account for the first user and (2) define functionality that is installed for the application.

In some examples, before receiving the request to install the application, the computer system receives a definition of the set of capability data and the set of functionality data for the application. In some examples, before receiving the request to install the application, the computer system verifies functionality of the application using automatically-generated screenshots of the application for a third surface. In some examples, the screenshots are automatically generated using the definition. In some examples, before receiving the request to install the application and in response to verifying the functionality of the application, the computer system approves the application for distribution on the hosted network (e.g., makes the application available for installation by others, such as the first user).

In some examples, the first set of user interfaces and functionality is based on a dynamic layout. In some examples, the dynamic layout changes based on the first user's account settings (e.g., one or more characteristics of the first user, such as frequency of use, ranking by user, a pinned application, personal data conveyed to the hosted network, applications that the user has installed and/or that are associated with the first user's account, characteristics that are deemed eligible because the first user is connected to the hosted network and/or has already conveyed the information to the hosted network). In some examples, the dynamic layout changes based on a setting and/or preference of the first user (e.g., associated with an account of the first user with the hosted network).

In some examples, after receiving the request to install the application from the plurality of applications on the hosted network, the computer system displays a plurality of user interface representations that includes a first user interface representation (e.g., a user interface that includes one or more user interface elements (e.g., buttons, content, selectable objects, colors, and/or the like) that corresponds to the first surface and a second user interface representation that corresponds to the second surface. In some examples, the first user interface representation is visually different from (e.g., has a different size, shape, contains a number of user interface elements that are different from) the second user interface representation. In some examples, the first user interface representation includes a different number of user interface elements than the second user interface representation.

In some examples, the first set of user interfaces and the functionality and the second set of user interfaces and functionality are hosted in the same network (e.g., the hosted network). In some examples, the first set of user interfaces and functionality and the second set of user interfaces and functionality are provided based on permission data associated with the application. In some examples, the first set of user interfaces and functionality and the second set of user interfaces and functionality are executed in a sandbox that is determined based on the set of capability data and/or the set of functionality data.

In some examples, in accordance with a determination that the set of capability data is a first set of capability data and the set of functionality data is a first set of functionality data, the first set of user interfaces and functionality is a third set of user interfaces and functionality. In some examples, in accordance with a determination that the set of capability data is a second set of capability data that is different from the first set of capability data and the set of functionality data is the first set of functionality data, the first set of user interfaces and functionality is a fourth set of user interfaces and functionality that is different from the third set of user interfaces and functionality. In some examples, in accordance with a determination that the set of capability data is the first set of capability data and the set of functionality data is a second set of functionality data that is different from the first set of functionality data, the first set of user interfaces and functionality is a fifth set of user interfaces and functionality that is different from the third set of user interfaces and functionality and the fourth set of user interfaces and functionality. In some examples, in accordance with a determination that the set of capability data is the second set of capability data and the set of functionality data is the second set of functionality data, the first set of user interfaces and functionality is a sixth set of user interfaces and functionality that is different from the third set of user interfaces and functionality, the fourth set of user interfaces and functionality, and the fifth set of user interfaces and functionality.

It is to be understood that the above description is intended to be illustrative, and not restrictive. Many other examples will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A computer system, comprising:
   one or more processors; and
   memory storing one or more programs configured to be executed by the one or more processors, the one or more programs including instructions for:
   receiving a request, from a first user, to install an application from a plurality of applications on a hosted network, wherein the application is associated with an application model, a set of capability data, and a set of functionality data; and
   after receiving the request to install the application from the plurality of applications, accessing the set of capability data and the set of functionality data associated with the application to determine a collection of customizations and functionality to install in accordance with the first user's account settings, wherein:
   in accordance with a determination that the first user's account settings correspond to a first surface, installing a first set of user interfaces and functionality associated with the application based on the set of capability data and the set of functionality data; and
   in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

2. The computer system of claim 1, wherein the set of capability data indicates one or more permissions required by the application, one or more events that occur during execution of the application, one or more events external to the application that cause the application to perform an operation, or one or more application programming interfaces used by the application.

3. The computer system of claim 1, wherein the first set of user interfaces includes a graphical user interface of the application that has been customized to match one or more preferences of the first user.

4. The computer system of claim 1, wherein the functionality data includes a schema for a graphical user interface, wherein the graphical user interface is automatically generated for the first surface based on the schema after receiving the request to install the application and in accordance with a determination that the first user's account settings correspond to the first surface, and wherein functionality of the first set of user interfaces and functionality is based on a type of the first surface.

5. The computer system of claim 1, wherein the hosted network includes a single permissions model for a plurality of different surfaces such that permissions for the application during installation (1) are dynamically determined based on a type of user account for the first user and (2) define functionality that is installed for the application.

6. The computer system of claim 1, further comprising:
   before receiving the request to install the application:
   receiving a definition of the set of capability data and the set of functionality data for the application;
   verifying functionality of the application using automatically-generated screenshots of the application for a third surface, wherein the screenshots are automatically generated using the definition; and
   in response to verifying the functionality of the application, approving the application for distribution on the hosted network.

7. The computer system of claim 1, wherein the first set of user interfaces and functionality is based on a dynamic layout, and wherein the dynamic layout changes based on the first user's account settings.

8. A non-transitory computer-readable storage medium storing one or more programs configured to be executed by one or more processors of a computer system, the one or more programs including instructions for:
   receiving a request, from a first user, to install an application from a plurality of applications on a hosted network, wherein the application is associated with an application model, a set of capability data, and a set of functionality data;
   after receiving the request to install the application from the plurality of applications, accessing the set of capability data and the set of functionality data associated with the application to determine a collection of customizations and functionality to install in accordance with the first user's account settings, wherein:
   in accordance with a determination that the first user's account settings correspond to a first surface, installing a first set of user interfaces and functionality associated with the application based on the set of capability data and the set of functionality data; and
   in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

9. The non-transitory computer-readable storage medium of claim 8, wherein the set of capability data indicates one or more permissions required by the application, one or more events that occur during execution of the application, one or more events external to the application that cause the application to perform an operation, or one or more application programming interfaces used by the application.

10. The non-transitory computer-readable storage medium of claim 8, wherein the first set of user interfaces includes a graphical user interface of the application that has been customized to match one or more preferences of the first user.

11. The non-transitory computer-readable storage medium of claim 8, wherein the functionality data includes a schema for a graphical user interface, wherein the graphical user interface is automatically generated for the first surface based on the schema after receiving the request to install the application and in accordance with a determination that the first user's account settings correspond to the first surface, and wherein functionality of the first set of user interfaces and functionality is based on a type of the first surface.

12. The non-transitory computer-readable storage medium of claim 8, wherein the hosted network includes a single permissions model for a plurality of different surfaces such that permissions for the application during installation (1) are dynamically determined based on a type of user account for the first user and (2) define functionality that is installed for the application.

13. The non-transitory computer-readable storage medium of claim 8, the one or more programs including instructions for:
before receiving the request to install the application:
receiving a definition of the set of capability data and the set of functionality data for the application;
verifying the functionality of the application using automatically-generated screenshots of the application for a third surface, wherein the screenshots are automatically generated using the definition; and
in response to verifying the functionality of the application, approving the application for distribution on the hosted network.

14. The non-transitory computer-readable storage medium of claim 8, wherein the first set of user interfaces and functionality is based on a dynamic layout, and wherein the dynamic layout changes based on the first user's account settings.

15. A method, comprising:
by a computer system:
receiving a request, from a first user, to install an application from a plurality of applications on a hosted network, wherein the application is associated with an application model, a set of capability data, and a set of functionality data;
after receiving the request to install the application from the plurality of applications, accessing the set of capability data and the set of functionality data associated with the application to determine a collection of customizations and functionality to install in accordance with the first user's account settings, wherein:
in accordance with a determination that the first user's account settings correspond to a first surface, installing a first set of user interfaces and functionality associated with the application based on the set of capability data and the set of functionality data; and
in accordance with a determination that the first user's account settings correspond to a second surface, installing a second set of user interfaces and functionality associated with the application based on the set of capability data and the set of functionality data, wherein the first set of user interfaces and functionality are different from the second set of user interfaces and functionality.

16. The method of claim 15, wherein the set of capability data indicates one or more permissions required by the application, one or more events that occur during execution of the application, one or more events external to the application that cause the application to perform an operation, or one or more application programming interfaces used by the application.

17. The method of claim 15, wherein the first set of user interfaces includes a graphical user interface of the application that has been customized to match one or more preferences of the first user.

18. The method of claim 15, wherein the functionality data includes a schema for a graphical user interface, wherein the graphical user interface is automatically generated for the first surface based on the schema after receiving the request to install the application and in accordance with a determination that the first user's account settings correspond to the first surface, and wherein functionality of the first set of user interfaces and functionality is based on a type of the first surface.

19. The method of claim 15, wherein the hosted network includes a single permissions model for a plurality of different surfaces such that permissions for the application during installation (1) are dynamically determined based on a type of user account for the first user and (2) define functionality that is installed for the application.

20. The method of claim 15, further comprising:
before receiving the request to install the application:
receiving a definition of the set of capability data and the set of functionality data for the application;
verifying the functionality of the application using automatically-generated screenshots of the application for a third surface, wherein the screenshots are automatically generated using the definition; and
in response to verifying the functionality of the application, approving the application for distribution on the hosted network.

* * * * *